United States Patent
Uchida et al.

(10) Patent No.: US 8,367,204 B2
(45) Date of Patent: Feb. 5, 2013

(54) LIQUID CURABLE RESIN COMPOSITION AND CURED PRODUCTS

(75) Inventors: Hirofumi Uchida, Umezone (JP); Zen Komiya, Umezone (JP); Takashi Ukachi, Kamiya (JP)

(73) Assignees: DSM IP Assets B.V., Heerlen (NL); JSR Corporation, Tokyo (JP)

( * ) Notice: Subject to any disclaimer, the term of this patent is extended or adjusted under 35 U.S.C. 154(b) by 554 days.

(21) Appl. No.: 09/983,216

(22) Filed: Oct. 23, 2001

(65) Prior Publication Data

US 2002/0127400 A1 Sep. 12, 2002

Related U.S. Application Data

(63) Continuation of application No. PCT/NL00/00260, filed on Apr. 21, 2001.

(30) Foreign Application Priority Data

Apr. 23, 1999 (JP) .................. 11-116089

(51) Int. Cl.
*B32B 17/00* (2006.01)
*G02B 6/00* (2006.01)
*C08G 18/67* (2006.01)

(52) U.S. Cl. ........... 428/375; 428/392; 522/96; 522/90; 522/97; 522/182; 522/120; 385/123; 385/145

(58) Field of Classification Search .......... 428/375, 428/392; 522/96, 90, 97, 182, 120, 121; 385/123, 144, 145
See application file for complete search history.

(56) References Cited

U.S. PATENT DOCUMENTS

| 5,804,311 | A | 9/1998 | Suwa et al. | |
|---|---|---|---|---|
| 6,136,880 | A * | 10/2000 | Snowwhite et al. | 522/64 |
| 6,187,835 | B1 | 2/2001 | Szum et al. | |
| 6,191,187 | B1 * | 2/2001 | Yamamura et al. | 522/96 |
| 6,359,025 | B1 * | 3/2002 | Snowwhite et al. | 522/64 |
| 6,528,553 | B1 * | 3/2003 | Komiya et al. | 522/96 |
| 7,214,431 | B2 * | 5/2007 | Komiya et al. | 428/411.1 |
| 2001/0008691 | A1 * | 7/2001 | Isogai et al. | 428/412 |
| 2002/0127400 | A1 * | 9/2002 | Uchida et al. | 428/375 |

FOREIGN PATENT DOCUMENTS

| EP | 1 189 848 B1 | 7/2005 | |
|---|---|---|---|
| WO | 9617000 | 6/1996 | |
| WO | 9841483 | 9/1998 | |
| WO | 9856846 | 12/1998 | |
| WO | 9915473 | 4/1999 | |
| WO | WO 00/64831 | * 11/2000 | |

OTHER PUBLICATIONS

"Common Chemistry", Methanone, information sheet, 2009.*
"Sumisorb 130", Product information sheet, 2010.*

* cited by examiner

*Primary Examiner* — Jill Gray
(74) *Attorney, Agent, or Firm* — Nixon & Vanderhye, PC

(57) ABSTRACT

A curable resin composition comprising an antioxidant, a UV absorber, and a (meth)acrylate oligomer comprising polyether units. Cured products made from the liquid curable resin composition of the present invention have excellent light stability. The resin composition is suitable as a coating material for optical fibers.

31 Claims, No Drawings

LIQUID CURABLE RESIN COMPOSITION AND CURED PRODUCTS

This is a Continuation of International Application No. PCT/NL00/00260 filed Apr. 21, 2001 which designated the U.S. and was published in the English language.

BACKGROUND OF THE INVENTION

The invention relates to a liquid curable resin composition exhibiting excellent light resistance and suitable as a coating material for optical fibers, optical fiber ribbons, and the like, and to a cured product thereof.

In the manufacturing of optical fibers, resin coatings are provided over glass fibers prepared by spinning a molten glass for protection and reinforcement. As such a resin coating, a structure consisting of a primary flexible coating layer formed on the surface of optical fibers and a secondary rigid coating layer applied thereon is known. Optical fiber ribbons comprising a number of fibers provided with the above resin coatings bundled side by side on the same plane by using bundling materials are also well known. Resin compositions for primary coating layers, secondary coating layers, and bundling materials for optical fiber ribbons are designated as primary materials, secondary materials, and tape materials, respectively. These resin coatings are usually provided by curing a liquid curable resin composition applied on the surface of the optical fibers by using heat or light, in particular, ultraviolet rays.

Since optical fibers are used over a long period of time, the coating material used for the optical fibers must exhibit only a slight change in properties over a long period of time.

SUMMARY OF THE INVENTION

The invention features a curable resin composition which can produce cured products exhibiting little change in the properties over time, particularly exhibiting excellent stability when exposed to light for a long period of time. The coating material contains a polymerizable oligomer containing a polyether polyol in which the polyether includes a C1-C6 alkyl group on at least one backbone carbon atom that is bonded to the ether oxygen atom. For example, coating material containing a polymerizable oligomer containing the structural unit shown in formula (1) easily changes its properties due to possession of a large number of, relative to the hydrogen atom adjacent to the tertiary carbon atom, comparatively chemically unstable hydrogen atoms.

$$—CH_2CH(CH_3)O— \quad (1)$$

The curable resin composition preferably includes a polymerizable oligomer containing the structural unit shown in formula (1) and optionally copolymeric oligomers comprising the structural unit shown in formula (1) and mixture of either or both of these types of oligomers with other oligomers, a phenol-type antioxidant, and a UV absorber.

The invention also features cured products formed therefrom. The cured products made from the liquid curable resin composition of the present invention have excellent light stability. The ratio of modulus of elasticity for the composition immediately after curing to the ratio of modulus of elasticity for the cured composition after being exposed to light from a fluorescent lamp for 3 months at a temperature of 23° C. and humidity of 50% RH is greater than 0.50, preferably greater than 0.60, and more preferably greater than 0.65. The resin composition is suitable as a coating material for optical fibers.

The invention also features stabilized optical fiber coatings and protective materials, and in particular radiation-curable optical fiber coatings and protective materials which include a combination of antioxidants, secondary antioxidants and UV light stabilizers and/or UV absorbers as additive compounds which impart color stability to the coating even under fluorescent light, a light condition under which coated optical fibers are frequently stored. The combination of antioxidants, secondary antioxidants, and UV light stabilizers and/or UV absorbers in a radiation-curable coating composition can give rise to surprising, synergistic effects in the cured coating which are not achieved by any one of the compounds when used alone in a coating composition.

DETAILED DESCRIPTION

The polymerizable oligomer containing the structural unit shown in formula (1) is an oligomer having both the structural unit of formula (1) and a polymerizable double bond, for example, an oligomer containing the structural unit of formula (1) and a (meth)acryl group. A preferable polymerizable oligomer can be prepared from a polyether polyol containing the structural unit of formula (1), a diisocyanate compound, and a hydroxyl group-containing (meth)acrylate, by reacting a diisocyanate group of the diisocyanate compound with a hydroxyl group of the polyether polyol or a hydroxyl group of the hydroxyl group-containing (meth)acrylate. More preferably, the oligomer is formed from a low unsaturation polyether oligomer, in particular an oligomer formed from a polypropylene glycol or a copolymer comprising propyleneoxide and ethyleneoxide having a molecular weight greater than 1,200, preferably between 1,500 and 13,000 and an amount of unsaturation of less than 0.01 meq/g.

In the preparation of the polymerizable oligomer, the polyol, diisocyanate compound, and hydroxyl group-containing (meth)acrylate are preferably used in such proportions that the isocyanate group of diisocyanate and the hydroxyl group of hydroxyl group-containing (meth)acrylate are respectively 1.1-2 equivalents and 0.1-1 equivalent for each equivalent of the hydroxyl group of polyether polyol.

This reaction is carried out by, for example, a method of reacting a polyether polyol, a diisocyanate compound, and a hydroxyl group-containing (meth)acrylate altogether; a method of reacting a polyether polyol and a diisocyanate compound first and then reacting the resulting product with a hydroxyl group-containing (meth)acrylate; a method of reacting a diisocyanate compound and a hydroxyl group-containing (meth)acrylate first and then reacting the resulting product with a polyether polyol; or a method of reacting a diisocyanate compound and a hydroxyl group-containing (meth)acrylate first, reacting the resulting product with a polyether polyol, and again with a hydroxyl group-containing (meth)acrylate.

The polyether polyol has a polyether backbone. The polyether backbone repeat units can be based on, for example, C2-C6 alkyleneoxy repeat structures. Representative polyether structures include, for example, ethyleneoxy, propyleneoxy, and tetramethyleneoxy repeat units. The repeat structures may include C1-C6 alkyl side groups, such as side groups on a backbone carbon atom that is bonded to an ether oxygen atom. For example, the polyether backbone can have substituents such as methyl or ethyl or other alkyl or substituted alkyl groups as side groups off of the polyether backbone.

In particular, the polyether polyol can contain the structural unit of formula (1) used for the synthesis of a polymerizable oligomer. The polyether polyol including the structural unit of formula (1) can be, for example, polypropylene glycol, or a polyether polyol obtained by a ring-opening copolymerization of propylene oxide and at least one type of other ion-polymerizable cyclic compound can be given. Examples of the above ion-polymerizable cyclic compounds include cyclic ethers such as ethylene oxide, butene-1-oxide, isobutene oxide, 3,3-bis(chloromethyl)oxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and benzoic acid glycidyl ester. The average number of functional groups (for example, the number of hydroxyl group) in such a polyether polyol is preferably from 1.5 to 6.0, to ensure a favorable gel proportion of the cured products and an adequate viscosity of the liquid curable resin composition of the present invention.

The above-mentioned polyether polyols are commercially available under the trade names of, for example, EXCENOL 720, 1020, 2020, 3030, 4030, PREMINOL 3010, 4002, 4010 (manufactured by Asahi Glass Urethane Co., Ltd.), PPTG 2000, PPTG 1000 (manufactured by Hodogaya Chemical), and the like.

The polyol, which is preferably a polyether polyol, may be a copolymeric polyol and/or a low unsaturation polyol (preferably having an amount of unsaturation of less than 0.01 meq/g. A suitable copolymeric polyol, which can be a random or a block copolymer, may be prepared in any suitable way and may contain units including additional (different) polyethers, polyesters, polycarbonates, polyolefins, polyacrylates, copolymers thereof and mixture therefrom. Preferably the copolymer is a block copolymer. Methods known in the art can be used to prepare the copolymeric structures. Formulation design of copolymeric oligomers can result in a better balance of properties and provide synergistic effects, which may be useful, for instance for fiber optic materials. In addition, polyol blends or mixtures can be used to balance properties and provide synergistic effects. A block copolymeric polyol can be prepared by any means known in the art, for instance by linking two or more pre-formed polymeric structures. The oligomers used in the present invention are not particularly limited by the process by which they are made and the block copolymeric polyols may, for instance, also be formed in situ.

The oligomer component of the present application may also consist of blends of one or more oligomers. In addition to the oligomer comprising at least on unit of formula (1), other polyols including other polyethers oligomers and others such as polyester oligomers, polycarbonates oligomers, polyolefin oligomers, polyacrylate oligomers, copolymers thereof and mixture therefrom. When the compositions of the present invention include more than one oligomer, it is preferred that the oligomer comprising at least one unit represented by formula (1) accounts for at least 50 wt. %, more preferably at least 65 wt. %, of the total mixture of (meth)acrylate oligomers present in the invention.

Linking pre-formed polymeric structures to form (meth)acrylate oligomers may be done in any suitable way, for instance by creating urethane linkages, e.g. by connecting the polymeric blocks with the use of diisocyanates.

A preferred copolymeric polyol is a polyol which has at least one block that comprises moieties represented by formula (1). The copolymeric oligomer can be formed by linking, for instance, a polypropyleneoxide diol with the polymerization product of (i) tetrahydrofuran, or (ii) a mixture of 20 percent by weight of 3-methyltetrahydrofuran and 80 percent by weight of tetrahydrofuran, both of which have undergone a ring opening polymerization. This latter (ii) polyether contains both branched and non-branched oxyalkylene repeating units and as an example PTGL 1000 (Hodogaya Chemical Company of Japan) can be given. Another example of a polyether in this series which can be used is PTGL 2000 (Hodogaya Chemical Company). Butyleneoxy repeat units are preferred to impart flexibility to one oligomer in particular and the pre-polymer system in general. Other examples of suitable polybutyleneoxides, such as polytetrahydrofuran, include PTHF2000 (BASF). Suitable polypropyleneoxide polyols include PPG3000 (BASF).

If a polyolefin diol is used, the polyolefin is preferably a linear or branched hydrocarbon containing a plurality of hydroxyl end groups. Fully saturated, for example, hydrogenated hydrocarbons, are preferred because the long term stability of the cured coating. Preferred copolymeric polyols include those obtained by linking a polypropyleneoxide diol block with a polytetrahydrofuran block, e.g. by using any of the below-mentioned diisocyanates, such as isophoronediisocyanate.

Preferably the polymeric block comprising, and more preferably consisting essentially of, structural units according to formula (1), has a molecular weight between 100 and 10,000, more preferably between 500 and 5000, and particularly preferably between 1,500 and 3,500. Other blocks, such as branched or non-branched polybutylenoxide blocks, preferably have a molecular weight between 100 and 10,000, more preferably between 500 and 5000, and particularly preferably between 2,000 and 4,000.

As a diisocyanate compound which is used for the synthesis of the polymerizable oligomer, an aromatic diisocyanate, alicyclic diisocyanate, aliphatic diisocyanate, and the like can be given. Examples of aromatic diisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanateethyl) fumarate, 6-isopropyl-1,3-phenyl diisocyanate, 4-diphenylpropane diisocyanate, tetramethylxylylene diisocyanate, and the like. Examples of alicyclic diisocyanates include isophorone diisocyanate, methylenebis (4-cyclohexylisocyanate), hydrogenated diphenylmethane diisocyanate, hydrogenated xylylene diisocyanate, 2,5-bis (isocyanatemethyl)-bicyclo[2.2.1]heptane, 2,6-bis(isocyanatemethyl)-bicyclo[2.2.1]heptane, and the like. As examples of aliphatic diisocyanates, 1,6-hexane diisocyanate, 2,2,4-trimethylhexamethylene diisocyanate, lysine diisocyanate, and the like can be given. Of these, aromatic diisocyanate compounds and alicyclic diisocyanate compounds are preferred, with particularly preferable compounds being 2,4-tolylene diisocyanate and isophorone diisocyanate. These diisocyanates can be used either individually or in combinations of two or more.

As a hydroxyl group-containing (meth)acrylate which is used for the synthesis of the polymerizable oligomer, a hydroxyl group-containing (meth)acrylate in which the hydroxyl group is bonded to the primary carbon atom (a primary hydroxyl group-containing (meth)acrylate) and a hydroxyl group-containing (meth)acrylate in which the hydroxyl group is bonded to the secondary carbon atom (a secondary hydroxyl group-containing (meth)acrylate) are desirable in view of the reactivity with an isocyanate group of diisocyanate compound.

Examples of the above (meth)acrylate containing a primary hydroxyl group include 2-hydroxyethyl(meth)acrylate, 2-hydroxypropyl (meth)acrylate, 4-hydroxybutyl(meth)acrylate, 1,6-hexanediol mono(meth)acrylate, 2-hydroxy-3-phenyloxypropyl(meth)acrylate, 1,4-butanediol mono(meth)acrylate, 2-hydroxyalkyl(meth)acryloyl phosphate, 4-hydroxycyclohexyl(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, and (meth)acrylate of formula (2):

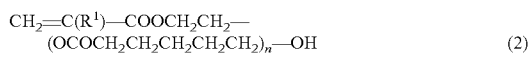

$$CH_2=C(R^1)-COOCH_2CH_2-(OCOCH_2CH_2CH_2CH_2CH_2)_n-OH \qquad (2)$$

wherein $R^1$ represents a hydrogen atom or a methyl group and n indicates an integer from 1-3. Examples of the above (meth)acrylate containing a secondary hydroxyl group include 2-hydroxypropyl(meth)acrylate, 2-hydroxybutyl (meth)acrylate, 2-hydroxy-3-phenyloxypropyl (meth)acrylate, 4-hydroxycyclohexyl (meth)acrylate, compounds obtained by the addition reaction of (meth)acrylic acid and glycidyl group-containing compounds such as alkyl glycidyl ether, allyl glycidyl ether, or glycidyl(meth)acrylate, and the like.

In the synthesis of the polymerizable oligomer, it is desirable to use a urethanization catalyst, such as copper naphthenate, cobalt naphthenate, zinc naphthenate, dibutyltin dilaurate, triethylamine, 1,4-diazabicyclo[2.2.2]octane, or 2,6,7-trimethyl-1,4-diazabicyclo[2.2.2]octane, in the amount from 0.01 to 1 wt % of the total amount of reactants. The reaction is usually carried out at 5-90° C., and preferably at 10-80° C.

To ensure excellent good breaking elongation of the cured products and favorable viscosity of the liquid curable resin composition of the present invention, the molecular weight of the polymerizable oligomer is usually in the range from 500 to 40,000, and preferably from 700 to 30,000, in terms of the polystyrene-reduced number average molecular weight determined by gel permeation chromatography.

To ensure excellent mechanical characteristics such as good breaking elongation of the cured products and favorable viscosity of the liquid curable resin composition of the present invention, the polymerizable oligomer is preferably incorporated in the liquid curable resin composition of the present invention in an amount from 20 to 85 wt %, and more preferably from 25 to 80 wt %.

It is possible to use a diamine together with a polyether polyol in the synthesis of the polymerizable oligomer. Examples of such a diamine include ethylenediamine, tetramethylenediamine, hexamethylenediamine, p-phenylenediamine, 4,4'-diaminodiphenylmethane, diamines containing a heteroatom, polyether diamines, and the like.

Part of the (meth)acrylates containing a hydroxyl group can be replaced by compounds having a functional group which can be added to an isocyanate group. As examples of such a compound, γ-aminopropyltriethoxysilane, γ-mercaptopropyltrimethoxysilane, and the like can be given. Use of these compounds generally improves adhesion to substrates such as glass.

As examples of UV absorbers used in the present invention, benzophenone-type UV absorbers, benzotriazole-type UV absorbers, and the like can be given. As benzophenone-type UV absorbers, 2-hydroxy-4-methoxybenzophenone, 2-hydroxy-4-octoxybenzophenone, 2,2'-di-hydroxy-4-methoxybenzophenone, and the like can be given. As benzotriazole-type UV absorbers, 2-(2'-hydroxy-5'-methylphenyl)benzotriazole, 2-(2'-hydroxy-3',5'-t-butylphenyl)benzotriazole, 2-(2'-hydroxy-5'-t-octylphenyl)benzotriazole, 2,4-di-t-butylphenyl-3',5'-di-t-butyl-4'-hydroxybenzotriazole, and the like can be given. Of these, benzophenone-type UV absorbers are particularly preferred to ensure improved light resistance of cured products made from the composition of the present invention. As examples of commercially available products, SUMISORB 110, 130, 140 (manufactured by Sumitomo Chemical Co., Ltd.), SEESORB 102, 103, 501, 202, 712, 704 (manufactured by Shipro Kasei K.K.), TINUVIN P, 234, 320, 326, 327, 328, 329, 213 (manufactured by Ciba Specialty Chemicals Co., Ltd.), and the like can be given. Of these, 2-hydroxy-4-methoxybenzophenone and 2-hydroxy-4-octoxybenzophenone are particularly preferred.

To minimize property change of the cured products and ensure excellent curability of the liquid curable resin composition, it is desirable that the UV absorbers be incorporated in the liquid curable resin composition of the present invention in an amount of at least 0.05 wt %, preferably from 0.05 to 3 wt %, particularly from 0.1 to 1.5 wt %.

Antioxidants which can be used in the compositions include, for example secondary amines and derivatives of phenol and hindered phenols. Examples of antioxidants which can be used include, for example, diphenyl (2,4,6,-trimethylbenzoyl)phosphine oxide, 1-hydroxycyclohexyl phenyl ketone, thiodiethylene bis(3,5,-di-t-butyl-4-hydroxy-hydrocinnamate), triethylene glycol bis[3-3(-t-butyl-4-hydroxy-5-methylphenyl)propionate], 2,2'-thiodiethyl bis-(3,5-di-t-butyl-4'-hydroxyphenyl) propionate, N,N'-diphenyl-p-phenylenediamine, phenyl-β-naphthylamine, 2,6-di-t-butyl-p-cresol, 2,2'-methylenebis(4-methly-6-t-butylphenol), 4,4-thiobis(3-methly-6-5-butylphenol), octadecyl 3,5-di-t-butyl-4-hydroxyhydrocinnamate, octadecyl 3-(3,5-di-t-butyl-4-hydroxyphenyl) propionate, 1,1,3-tris(2-methyl-4-hydroxy-5-t-butylphenyl) butane, 1,3,5-trimethyl-2,4,6-tris(3,5,-di-t-butyl-4-hydoxybenzyl) benzene, tetrakismethylene(3,5-di-t-butyl-4-hydroxycinnamate), or tetrakis(methylene 3-3',5'-di-t-butyl-4'-hydroxy-phenyl proprionate) methane.

As a phenol-type antioxidant which can be used in the present invention, a compound having a structure shown by formula (3) or formula (4) is desirable.

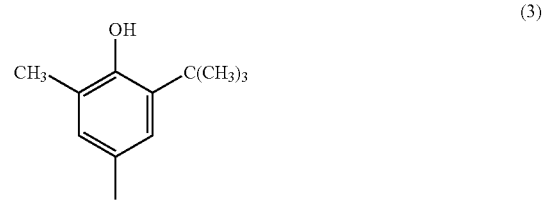

(3)

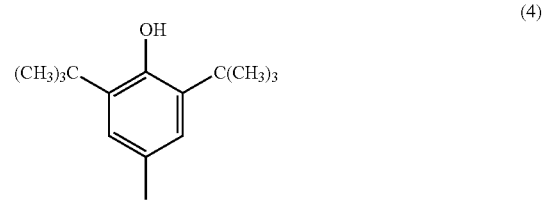

(4)

As examples of the phenol-type antioxidant having the structure of the formula (3), 3,9-bis[2-{3-(3-t-butyl-4-hydroxy-5-methylphenyl)propionloxy}-1,1-dimethylethyl]-2,4,8,10-tetraoxaspiro[5.5]undecane, triethylene glycol-bis{3-(3-t-butyl-5-methyl-4-hydroxy phenyl)propionate}, and the like can be given. As examples of the phenol-type antioxidant having the structure shown by the formula (4), thiodiethylene bis-(3,5-di-tert-butyl-4-hydroxy) hydrocinnamate, pentaerythrityl-tetrakis{3-(3,5-di-t-butyl-4-hydroxyphenyl) propionate}, 2,2-thio-diethylenebis{3-(3,5-di-t-butyl-4-hydroxyphenyl) propionate}, octadecyl-3-(3,5-di-t-butyl-4-hydroxyphenyl)propionate, 3,5-di-t-butyl-4-hydroxy-benzylphosphonate-diethyl ester, and the like can be given. As commercially available products of these compounds, IRGANOX 245, 1010, 1035, 1076, 1222 (manufactured by Ciba Specialty Chemicals Co., Ltd.), Sumilizer GA-80, BP101 (manufactured by Sumitomo Chemical Industries Co., Ltd.), and the like can be given. Of these compounds, 3,9-bis(2-{3-(3-t-butyl-4-hydroxy-5-methylphenyl)propionyloxy}-1,1-dimethylethyl)-2,4,8,10-tetraoxaspiro[5.5]undecane, triethylene glycol-bis{3-(3-t-butyl-5-methyl-4-hydroxy phenyl) propionate}, and 2,2-thio-diethylenebis{3-(3,5-di-t-butyl-4-hydroxyphenyl)propionate} are particularly preferred.

To minimize property change of the cured products and excellent curability of the liquid curable resin composition, it is desirable that the phenol-type antioxidant be incorporated in the liquid curable resin composition of the present invention in an amount from 0.1 to 3 wt %, particularly from 0.15 to 1.5 wt %.

Secondary antioxidants which can be used in the present invention include, for example, aliphatic thiols, disulfides and phosphites. The secondary antioxidant can be, for example, present in about 0.1 wt. % to about 3 wt. %. Secondary antioxidants which can be used include, for example, distearyl pentaerythritol diphosphite, isodecyl diphenyl phosphite, diisodecyl phenyl phosphite, tris(2,4-di-t-butylphenyl) phosphite, dilauryl-β,β-thiodipropionate, β-naphthyl disulfide, thiol-β-naphthol, 2-mercaptobenzothiazole, benzothiazyl disulfide, phenothiazine, tris(p-nonylphenyl)phosphite, or zinc dimethyldithiocarbamate. Other types of secondary antioxidants that may be suitable for the compositions of the present invention include, for example, organosulfur-type secondary antioxidant and phosphite-type secondary antioxidant can be incorporated in the composition of the present invention, as required. As examples of the organosulfur-type secondary antioxidant, IRGANOX PS800FL, PS802FL (manufactured by Ciba Specialty Chemicals Co., Ltd.), Sumilizer TL, MB (manufactured by Sumitomo Chemical Co., Ltd.), and the like can be given. As examples of the phosphite-type secondary antioxidants, Sumilizer TNP, TPP-R, P-16 (manufactured by Sumitomo Chemical Industries Co., Ltd.), and the like can be given.

In certain embodiments, to reduce yellowing after prolonged exposure to UV light or fluorescent light, light stabilizers, such hindered amine light stabilizers (HALS) can be used to inhibit photo-oxidation of polymers. Examples of hindered amine light stabilizers which can be used in the present invention include, for example, bis(2,2,6,6-tetramethyl-4-piperidinyl)sebacate, bis(1-octyloxy-2,2,6,6-tetramethyl-4-piperidinyl)sebacate, Dimethyl succinate polymer with 4-hydroxy-2,2,6,6-tetramethyl-1-piperidineethanol, or a polymeric hindered amine (CYASORB UV-3853S). Preferred light stabilizers include TINUVIN 292, 144, 622LD (manufactured by Ciba Specialty Chemicals Co., Ltd.), SANOL LS770 (manufactured by Sankyo Co., Ltd.), or SUMISORB TM-061 (manufactured by Sumitomo Chemical Co., Ltd.).

A polymerizable unsaturated monomer and a polymerization initiator are usually incorporated in the composition of the present invention.

As a polymerizable unsaturated monomer, a mono-functional compound and/or a poly-functional compound can be used. Examples of monofunctional compounds which can be used include vinyl group-containing lactam such as N-vinylpyrrolidone and N-vinylcaprolactam, alicyclic structure-containing (meth)acrylates such as isobornyl(meth)acrylate, bornyl(meth)acrylate, tricyclodecanyl(meth)acrylate, dicyclopentanyl(meth)acrylate, dicyclopentenyl (meth)acrylate, and cyclohexyl(meth)acrylate, benzyl (meth)acrylate, 4-butylcyclohexyl(meth)acrylate, acryloylmorpholine, vinylimidazole, vinylpyridine, and the like. In addition, (meth)acrylates shown by formula (5),

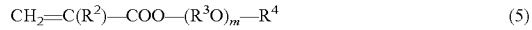

$$CH_2=C(R^2)-COO-(R^3O)_m-R^4 \qquad (5)$$

wherein $R^2$ represents a hydrogen atom or a methyl group, $R^3$ represents an alkylene group having 2-6, and preferably 2-4 carbon atoms, $R^4$ represents a hydrogen atom or an alkyl group having 1-12 carbon atoms, and preferably 1-9 carbon atoms, and m is an integer from 0-12, and preferably from 1-8; ether group-containing (meth)acrylates such as tetrahydrofurfuryl (meth)acrylate and phenoxyethyl(meth)acrylate; amino group-containing (meth)acrylates such as dimethylaminoethyl(meth)acrylate, diethylaminoethyl (meth)acrylate, and 7-amino-3,7-dimethyloctyl (meth)acrylate; (meth) acrylamide such as diacetone (meth)acrylamide, isobutoxymethyl(meth)acrylamide, N,N-dimethyl(meth) acrylamide, t-octyl (meth)acrylamide, N,N-diethyl(meth) acrylamide, and N,N-dimethylaminopropyl(meth)acrylamide; and vinyl ethers such as hydroxybutyl vinyl ether, lauryl vinyl ether, cetyl vinyl ether, and 2-ethylhexyl vinyl ether; and the like can be given. Among these, as (meth) acrylates shown by the formula (5), hydroxyalkyl (meth) acrylates such as 2-hydroxyethyl(meth)acrylate, 2-hydroxypropyl(meth)acrylate, and 2-hydroxybutyl (meth)acrylate; alkyl(meth)acrylate such as methyl (meth)acrylate, ethyl (meth)acrylate, propyl (meth)acrylate, isopropyl(meth)acrylate, butyl (meth)acrylate, amyl(meth)acrylate, isobutyl (meth)acrylate, t-butyl(meth)acrylate, pentyl (meth)acrylate, isoamyl(meth)acrylate, hexyl (meth)acrylate, heptyl(meth) acrylate, octyl (meth)acrylate, iso-octyl(meth)acrylate, 2-ethylhexyl (meth)acrylate, nonyl(meth)acrylate, decyl (meth)acrylate, iso-decyl(meth)acrylate, undecyl (meth) acrylate, dodecyl(meth)acrylate, lauryl (meth)acrylate, stearyl(meth)acrylate, and iso-stearyl (meth)acrylate; alkoxy group-containing (meth)acrylate such as butoxyethyl(meth) acrylate, ethoxyethyl (meth)acrylate, methoxyethylene glycol (meth)acrylate, ethoxydiethylene glycol (meth)acrylate, methoxypolyethylene glycol (meth)acrylate, and methoxypolypropylene glycol (meth)acrylate; polyalkylene glycol mono(meth)acrylates such as polyethylene glycol mono (meth)acrylate, polypropylene glycol mono(meth)acrylate, and the like can be given.

As examples of commercially available products of monofunctional compounds used as a polymerizable unsaturated monomer, ARONIX M-111, M-113, M-114, M-117 (manufactured by Toagosei Co., Ltd.), KAYARAD TC110S, R629, R644 (manufactured by Nippon Kayaku Co., Ltd.), IBXA, Viscoat3700 (manufactured by Osaka Organic Chemical Industry, Ltd.), and the like can be given.

Examples of polyfunctional compounds used as the reactive diluents include trimethylolpropane tri(meth)acrylate, pentaerythritol tri(meth)acrylate, ethylene glycol di(meth) acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth) acrylate, trimethylolpropanetrioxyethyl(meth)acrylate, tris (2-hydroxyethyl) isocyanurate tri(meth)acrylate, tris(2-hydroxyethyl) isocyanurate di(meth)acrylate, tricyclodecanedimethanol di(meth)acrylate, di(meth)acrylate of diol of ethylene oxide or propylene oxide adduct of bisphenol A, di(meth)acrylate of diol of ethylene oxide or propylene oxide adduct of hydrogenated bisphenol A, epoxy (meth)acrylate obtained by the addition of (meth)acrylate to diglycidyl ether of bisphenol A, triethylene glycol divinyl ether, and the like. Examples of commercially available products of the above polyfunctional compounds include Yupimer UV SA1002, SA2007 (manufactured by Mitsubishi Chemical Corp.), Viscoat 700 (manufactured by Osaka Organic Chemical Industry, Ltd.), KAYARAD R-604, DPCA-20, DPCA-30, DPCA-60, DPCA-120, HX-620, D-310, D-330 (manufactured by Nippon Kayaku Co., Ltd.), ARONIX M-210, M-215, M-315, M-325 (manufactured by Toagosei Co., Ltd.), and the like.

These polymerizable unsaturated monomers may be used either individually or in combination of two or more.

To ensure excellent characteristics such as good breaking elongation of the cured products and favorable viscosity of the liquid curable resin composition of the present invention, the polymerizable unsaturated monomer (D) is preferably incorporated in the liquid curable resin composition of the present invention in an amount from 10 to 80 wt %, and more preferably from 15 to 75 wt %.

Polymerization initiators which can be used in the present invention include heat polymerization initiators and photopolymerization initiators. Peroxide compounds, azo compounds, and like can be given as examples of heat polymerization initiators. Specific examples include benzoyl peroxide, t-butyloxy benzoate, azobisisobutyronitrile, and the like.

If the liquid curable resin composition of the present invention is cured by irradiation of light, a photopolymerization initiator is used Optionally, a photosensitizer can also be added. Given as examples of the photopolymerization initiator are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methyl-propan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyl diphenylphosphine oxide, and bis-(2,6-dimethoxybenzoyl)-2,4,4-trimethylpentylphosphine oxide. Examples of commercially available products of these compounds include 1-hydroxy-cyclohexyl-phenyl-ketone; 2-benzyl-2-dimethylamino-1-(4-morpholinophenyl)-butanone-1; 2,2-dimethoxy-1,2-diphenylethan-1-one; a 1:1 mixture by weight of 1-hydroxy-cyclohexyl-phenyl-ketone and benzophenone; 2-methyl-1-(4-methylthiophenyl)-2-morpholinopropan-1-one; a mixture of 25% bis(2,6-dimethoxybenzoyl)-2,4,4-trimethyl pentylphosphineoxide and 75% 2-hydroxy-2-methyl-1-phenyl-propan-1-one; bisacyl phosphine oxide; 2-hydroxy-2-methyl-1-(4-isopropylphenyl)-1-propanone; 2-hydroxy-2-methyl-1-phenyl-propan-1-one; Methanone, (diphenylphosphinyl)(2,4,6-trimethylphenyl)-; Benzoic acid, 4-benzoyl-, methyl ester; and the like. As photosensitizers, for example, triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate, and the like can be given. As commercially available products, Ubecryl P102, 103, 104, 105 (manufactured by UCB) and the like can be given.

When the liquid curable resin composition of the present invention is cured using both heat and ultraviolet rays, the above-mentioned heat polymerization initiator and photopolymerization initiator can be used in combination. The proportion of a polymerization initiator (E) used in the liquid curable composition of the present invention is preferably 0.1-10 wt %, and more preferably 0.3-7 wt %.

Furthermore, other curable oligomers and polymers, non-curable photosensitizers, and other additives can optionally be added to the liquid curable resin composition of the present invention inasmuch as characteristics of the composition of the present invention are not impaired.

Examples of such curable oligomers and polymers include polyester (meth)acrylate, epoxy (meth)acrylate, polyamide (meth)acrylate, siloxane polymers having a (meth)acryloyloxy group, glycidyl methacrylate, and the like.

Various additives such as coloring agents, light stabilizers, silane coupling agents, heat polymerization inhibitors, leveling agents, surfactants, preservatives, plasticizers, lubricants, solvents, fillers, aging preventives, wettability improvers, and coating surface improvers can also be added in addition to the above components, as required. As examples of the silane coupling agents, γ-aminopropyltriethoxysilane, γ-mercaptopropyltrimethoxysilane, γ-methacryloxypropyl trimethoxysilane, and the like, and commercially available products such as SH6062, 6030 (manufactured by Dow Corning Toray Silicone Co., Ltd.), and KBE903, 603, 403 (manufactured by Shin-Etsu Chemical Co., Ltd.) can be given.

The composition of the present invention can be cured by heat or radiation. Here, radiation includes infrared rays, visible rays, ultraviolet rays, X-rays, electron beams, α-rays, β-rays, γ-rays, and the like. Ultraviolet rays are particularly preferable.

Preferred embodiments of the present invention include:
1) A liquid curable resin composition comprising a polymerizable oligomer containing the structural unit shown in formula (1) having a mw greater than 1200, a phenol-type antioxidant, a UV absorber, a polymerizable unsaturated monomer, and) a polymerization initiator.
2) The composition described in 1) above, wherein the a phenol-type antioxidant is 3,9-bis[2-{3-(3-t-butyl-4-hydroxy-5-methylphenyl)propionyloxy}-1,1-dimethyl-ethyl]-2,4,8,10-tetraoxaspiro[5.5]undecane, triethylene glycol-bis{3-(3-t-butyl-5-methyl-4-hydroxy phenyl)propionate}, or 2,2-thio-diethylenebis{3-(3,5-di-t-butyl-4-hydroxyphenyl) propionate}, and the UV absorber is 2-hydroxy-4-methoxybenzophenone or 2-hydroxy-4-octoxybenzophenone.
3) The composition described in 2) above, wherein the oligomer is an oligomer obtained by the reaction of polypropylene glycol (may be a low unsaturation polypropylene glycol) and/or a polyether polyol obtained by the ring-opening copolymerization of propylene oxide and at least one type of another ion-polymerizable cyclic compound, a diisocyanate compound, and a hydroxyl group-containing acrylate, and having a polystyrene-reduced molecular weight determined by gel permeation chromatography of 500 to 40,000.
4) The liquid curable resin composition described in 1), 2), or 3), wherein the content of a polymerizable oligomer containing the structural unit shown by the formula (1), a phenol-type antioxidant, a UV absorber, a polymerizable unsaturated monomer, and a polymerization initiator is respectively 20-85 wt %, 0.1-3 wt %, 0.05-3 wt %, 10-80 wt %, and 0.1-10 wt %.

EXAMPLES

The present invention will now be illustrated by way of examples, which should not be construed as limiting the present invention.

Preparation of Polymerizable Oligomer (A)

A reaction vessel equipped with a stirrer was charged with polypropylene glycol having a number average molecular weight of 3000 (868.8 g), isophorone diisocyanate (96.4 g), 2,6-di-t-butyl-p-cresol (0.02 g), and phenothiazine (0.008 g). The mixture was cooled to 15° C. while stirring. After the addition of dibutyltin dilaurate (0.08 g), the mixture was slowly heated to 35° C. while stirring for one hour. Then, the temperature was raised to 50° C. to complete the reaction. After the residual isocyanate concentration reduced to 1.26 wt % or less (for the total amount of the reactants), 2-hydroxyethyl acrylate (33.6 g) was added and the mixture was allowed to react at about 60° C. while stirring. The reaction was terminated when the residual isocyanate was 0.1 wt % or less, to obtain a polymerizable oligomer.

Example 1-4 and Comparative Example 5-7

A reaction vessel equipped with a stirrer was charged with the compounds listed in Table 1 at a ratio by weight shown in Table 1. The mixture was stirred at 50° C. to produce a homogeneous solution, thus obtaining the compositions of Examples and Comparative Examples.

Light Resistance Test

The light resistance of cured products obtained from the liquid curable resin compositions of Examples and Comparative Examples was measured. The liquid curable resin compositions were applied to a glass plate using an applicator with a thickness of 254 μm. The compositions were then exposed to ultraviolet rays by using a 3.5 kW metal halide lamp ("SMX-3500/F-OS", manufactured by ORC Co., Ltd.) at a dose of 1 J/cm$^2$ in air to form cured films having a thickness of about 130 μm. The cured film was placed on a white release paper and exposed to light from a fluorescent lamp for 3 months at a temperature of 23° C. and humidity of 50% RH. The fluorescent lamp used was FL20SSN/18 manufactured by Toshiba and the illumination intensity on the curing film was 1200 1x. Test specimens for measurement of modulus of elasticity were obtained by cutting the cured films before and after exposure to light from the fluorescent lamp into a width of 0.6 cm. Using these test specimens, modulus of elasticity of cured films before and after exposure to light from the fluorescent lamp was measured according to JIS K7127 at a drawing rate of 1 mm/min, a bench mark distance of 25 mm, at 23° C. and 50% RH. The light resistance was evaluated by the ratio (modulus of elasticity of the cured film after exposure/modulus of elasticity of the cured film before exposure).

The components in Table 1 are as follows.

Phenol-type antioxidant A: 2,2-thio-diethylene-[bis-3-(3,5-di-t-butyl-4-hydroxyphenyl)propionate]

Phenol-type antioxidant B: Triethylene glycol-bis{3-(3-t-butyl-5-methyl-4-hydroxyphenyl)propionate}

Phenol-type antioxidant C: 3,9-bis[2-{3-(3-t-butyl-4-hydroxy-5-methylphenyl)propionyloxy}-1,1-dimethylethyl]-2,4,8,10-tetraoxaspiro[5.5]undecane Benzophenone-type UV absorber A: 2-Hydroxy-4-methoxybenzophenone Benzophenone-type UV absorber B: 2-Hydroxy-4-octohexybenzophenone Benzotriazole-type UV absorber C: 2-(2'-Hydroxy-5'-methylphenyl) benzotriazole Photo-stabilizer A: Polymerization condensate of dimethyl-1-(2-hydroxyethyl)-4-hydroxy-2,2,6,6-tetramethylpiperidine succinate Photo-initiator A: 2,4,6-Trimethylbenzoyldiphenylphosphine oxide Silane coupling agent A: γ-Mercaptopropyltrimethoxysilane

TABLE 1

|  | Example | | | | Comparative Examples | | |
| --- | --- | --- | --- | --- | --- | --- | --- |
|  | 1 | 2 | 3 | 4 | 5 | 6 | 7 |
| Polymerizable oligomer (a) | 72.0 | 72.0 | 72.0 | 72.0 | 72.0 | 72.0 | 72.0 |
| Polyoxyethylene nonylphenyl ether acrylate | 5.5 | 5.5 | 5.5 | 5.5 | 5.5 | 5.5 | 5.5 |
| Isobornyl acrylate | 15.5 | 15.5 | 15.5 | 15.5 | 15.5 | 15.5 | 15.5 |
| N-vinylcaprolactam | 7.0 | 7.0 | 7.0 | 7.0 | 7.0 | 7.0 | 7.0 |
| Phenol-type antioxidant A | 0.3 | 0.3 | 0.3 | — | 0.6 | — | — |
| Phenol-type antioxidant B | — | — | 0.3 | — | — | — | — |
| Phenol-type antioxidant C | 0.3 | 0.3 | — | 0.6 | — | — | — |
| Benzophenone-type UV absorber A | 0.15 | — | 0.15 | 0.15 | — | 0.15 | — |
| Benzophenone-type UV absorber B | — | 0.15 | — | — | — | — | — |
| Benzotriazole-type UV absorber C | — | — | — | — | — | — | 0.15 |
| Photo-stabilizer A | — | — | — | — | — | 0.6 | 0.6 |
| Photo-initiator A | 1.2 | 1.2 | 1.2 | 1.2 | 1.2 | 1.2 | 1.2 |
| Silane coupling agent A | 0.30 | 0.30 | 0.30 | 0.30 | 0.30 | 0.30 | 0.30 |
| Total | 102.25 | 102.25 | 102.25 | 102.25 | 102.25 | 102.25 | 102.25 |
| Modulus of elasticity before exposure (kg/cm$^2$) | 0.101 | 0.103 | 0.099 | 0.101 | 0.104 | 0.98 | 0.100 |
| Modulus of elasticity after exposure (kg/cm$^2$) | 0.071 | 0.069 | 0.069 | 0.074 | 0.043 | 0.027 | 0.023 |
| Ratio of modulus of elasticity (after exposure/before exposure) | 0.70 | 0.67 | 0.69 | 0.73 | 0.41 | 0.28 | 0.23 |

From Table 1, it is clear that liquid curable resin compositions comprising a polymerizable oligomer (A), a phenol-type antioxidant, and a UV absorber produce cure films with excellent light resistance.

The invention claimed is:

1. An optical fiber coated with one or more coatings, wherein at least one of said coatings is obtained by curing a composition consisting essentially of:
   (a) one or more oligomers having a radiation curable group, said one or more oligomers including a (meth) acrylate oligomer having a backbone, said backbone including a polyether comprising structural unit represented by the following formula (1)

(1)

wherein the (meth)acrylate oligomer is present in the composition in an amount greater than 50 wt. %, relative to the total amount of the (meth)acrylate oligomers;

(b) one or more antioxidants;

(c) at least 0.05 wt. % relative to the total weight of the composition of one or more UV absorbers, wherein the ratio of modulus of elasticity for the cured composition after being exposed to light from a fluorescent lamp for 3 months at a temperature of 23° C. and humidity of 50% RH is greater than 0.50;

(d) one or more polymerizable unsaturated monomers that are used as reactive diluents;

(e) one or more photoinitiators selected from the group consisting of 1-hydroxycyclohexyl phenyl ketone; 2,2-dimethoxy-2-phenylacetophenone; xanthone; fluorenone; benzaldehyde; fluorene; anthraquinone; triphenylamine; carbazole; 3-methylacetophenone; 4-chlorobenzophenone; 4,4'-dimethoxybenzophenone; 4,4'-diaminobenzophenone; Michler's ketone; benzoin propyl ether; benzoin ethyl ether; benzyl methyl ketal; 1-(4-isopropylphenyl)-2-hydroxy-2-methylpropan-1-one; 2-hydroxy-2-methyl-1-phenylpropan-1-one; thioxanthone; diethylthioxanthone; 2-isopropylthioxanthone; 2-chlorothioxanthone; 2-methyl-1-[4-(methylthio)phenyl]-2-morpholino-propan-1-one; 2,4,6-trimethylbenzoyl diphenylphosphine oxide; bis-(2,6-dimethoxybenzoyl)-2,4,4-trimethylpentylphosphine oxide; 1-hydroxy-cyclohexyl-phenyl-ketone; 2-benzyl-2-dimethylamino-1-(4-morpholinophenyl)-butanone-1; 2,2-dimethoxy-1,2-diphenylethan-1-one; a 1:1 mixture by weight of 1-hydroxy-cyclohexyl-phenyl-ketone and benzophenone; 2-methyl-1-(4-methylthiophenyl)-2-morpholinopropan-1-one; a mixture of 25% bis(2,6-dimethoxybenzoyl)-2,4,4-trimethyl pentylphosphineoxide and 75% 2-hydroxy-2-methyl-1-phenyl-propan-1-one; bisacyl phosphine oxide; 2-hydroxy-2-methyl-1-(4-isopropylphenyl)-1-propanone; 2-hydroxy-2-methyl-1-phenyl-propan-1-one; Methanone, (diphenylphosphinyl)(2,4,6-trimethylphenyl)-; Benzoic acid, 4-benzoyl-, methyl ester; and a combination thereof;

(f) one or more additives selected from the group consisting of coloring agents, light stabilizers, silane coupling agents, heat polymerization inhibitors, leveling agents, surfactants, preservatives, plasticizers, lubricants, solvents, fillers, aging preventives, wettability improvers, coating surface improvers;

wherein all oligomers included in the composition comprise urethane linkages.

2. The optical fiber according to claim 1, wherein said (meth)acrylate oligomer has a molecular weight of greater than 1200.

3. The optical fiber according to claim 1 wherein the UV absorber is a benzophenone derivative.

4. The optical fiber according to claim 1 wherein the antioxidant is a phenol derivative.

5. The optical fiber according to claim 1 wherein the antioxidant is a compound having a group represented by either formula (3) or formula (4):

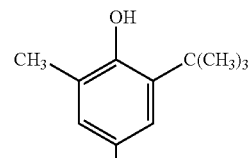

(3)

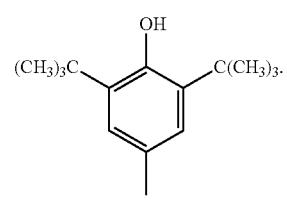

(4)

6. The optical fiber according to claim 1 wherein the UV absorber is selected from the group consisting of 2-hydroxy-4-methoxybenzophenone and 2-hydroxy-4-octoxybenzophenone.

7. The optical fiber according to claim 1 wherein the antioxidant is selected from the group consisting of 3,9-bis[2-{3-(3-t-butyl-4-hydroxy-5-ethylphenyl)propionyloxy}-1,1-dimethylethyl]-2,4,8,10-tetraoxaspiro[5.5]undecane, triethylene glycol-bis{3-(3-t-butyl-5-methyl-4-hydroxy phenyl)propionate}, and 2,2-thio-diethylenebis{3-(3,5-di-t-butyl-4-hydroxyphenyl)propionate}.

8. The optical fiber according to claim 1 wherein said ratio of modulus of elasticity is greater than 0.65.

9. The optical fiber according to claim 1 wherein the composition comprises two antioxidants.

10. The optical fiber according to claim 9 wherein the composition comprises two antioxidants each of which are present in an amount from 0.1 to 3 weight percent.

11. The optical fiber according to claim 9 wherein the composition comprises two antioxidants each of which are present in an amount from 0.15 to 1.5 weight percent.

12. The optical fiber according to claim 1 wherein said (meth)acrylate oligomer further comprises a unit derived from a different polyether polyol.

13. The optical fiber according to claim 1 wherein said (meth)acrylate oligomer further comprises a butylene oxide unit.

14. The optical fiber according to claim 1 wherein the composition comprises two or more oligomers.

15. The optical fiber according to claim 1 wherein said one or more oligomers are selected from the group consisting of polyesters, different polyethers, polycarbonates, polyolefins, copolymers thereof and mixtures thereof.

16. The optical fiber according to claim 1 wherein said light stabilizer comprises a hindered amine light stabilizer.

17. The optical fiber according to claim 1 wherein said composition can be cured by ultraviolet radiation.

18. The optical fiber according to claim 1 wherein the (meth)acrylate oligomer is derived from a glycol having an amount of unsaturation of less than 0.01 meq/g.

19. The optical fiber according to claim 1 wherein the (meth)acrylate oligomer is derived from a polypropylene glycol or a copolymer comprising propyleneoxide and ethyleneoxide units having an amount of unsaturation of less than 0.01 meq/g.

20. The optical fiber according to claim 1 wherein the antioxidant is a compound having a group represented by the following formula (3);

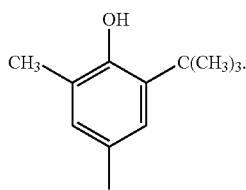

(3)

21. The optical fiber according to claim 1 wherein the composition comprises an antioxidant in an amount from 0.1 to 3 weight percent.

22. The optical fiber according to claim 1 wherein the composition comprises an antioxidant in an amount from 0.15 to 1.5 weight percent.

23. A curable composition consisting essentially of:
(a) one or more oligomers having a radiation curable group, said one or more oligomers including a polymerizable oligomer containing a structural unit represented by the following formula (1)

—CH$_2$CH(CH$_3$)O   (1)

wherein said polymerizable oligomer is present in the composition in an amount greater than 50 wt. %, relative to the total amount of the (meth)acrylate oligomers;
(b) one or more antioxidants, including a phenol-type antioxidant;
(c) at least 0.05 wt. % relative to the total weight of the composition of one or more UV absorbers, wherein the ratio of modulus of elasticity for the cured composition after being exposed to light from a fluorescent lamp for 3 months at a temperature of 23° C. and humidity of 50% RH is greater than 0.50;
(d) one or more polymerizable unsaturated monomers that are used as reactive diluents;
(e) one or more photoinitiators selected from the group consisting of 1-hydroxycyclohexyl phenyl ketone; 2,2-dimethoxy-2-phenylacetophenone; xanthone; fluorenone; benzaldehyde; fluorene; anthraquinone; triphenylamine; carbazole; 3-methylacetophenone; 4-chlorobenzophenone; 4,4'-dimethoxybenzophenone; 4,4'-diaminobenzophenone; Michler's ketone; benzoin propyl ether; benzoin ethyl ether; benzyl methyl ketal; 1-(4-isopropylphenyl)-2-hydroxy-2-methylpropan-1-one; 2-hydroxy-2-methyl-1-phenylpropan-1-one; thioxanthone; diethylthioxanthone; 2-isopropylthioxanthone; 2-chlorothioxanthone; 2-methyl-1-[4-(methylthio)phenyl]-2-morpholino-propan-1-one; 2,4,6-trimethylbenzoyl diphenylphosphine oxide; bis-(2,6-dimethoxybenzoyl)-2,4,4-trimethylpentylphosphine oxide; 1-hydroxy-cyclohexyl-phenyl-ketone; 2-benzyl-2-dimethylamino-1-(4-morpholinophenyl)-butanone-1; 2,2-dimethoxy-1,2-diphenylethan-1-one; a 1:1 mixture by weight of 1-hydroxy-cyclohexyl-phenyl-ketone and benzophenone; 2-methyl-1-(4-methylthiophenyl)-2-morpholinopropan-1-one; a mixture of 25% bis(2,6-dimethoxybenzoyl)-2,4,4-trimethyl pentylphosphineoxide and 75% 2-hydroxy-2-methyl-1-phenyl-propan-1-one; bisacyl phosphine oxide; 2-hydroxy-2-methyl-1-(4-isopropylphenyl)-1-propanone; 2-hydroxy-2-methyl-1-phenyl-propan-1-one; Methanone, (diphenylphosphinyl)(2,4,6-trimethylphenyl)-; Benzoic acid, 4-benzoyl-, methyl ester; and a combination thereof;

(f) one or more additives selected from the group consisting of coloring agents, light stabilizers, silane coupling agents, heat polymerization inhibitors, leveling agents, surfactants, preservatives, plasticizers, lubricants, solvents, fillers, aging preventives, wettability improvers, coating surface improvers;
wherein all oligomers included in the composition comprise urethane linkages.

24. The curable composition according to claim 23, wherein the phenol-type antioxidant is a compound having a group represented by either formula (3) or formula (4):

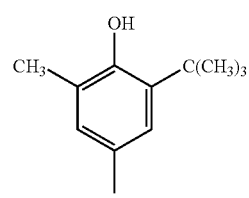

(3)

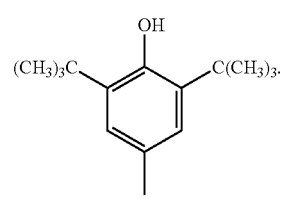

(4)

25. The curable composition according to claim 23, wherein the phenol-type antioxidant is a compound having a group represented by formula (3):

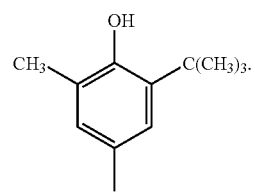

(3)

26. A method of producing a coating on an optical fiber comprising:
(i) curing a composition according to claim 23 on the surface of the optical fiber.

27. An optical fiber coated with one or more coatings, wherein at least one of said coatings is obtained by curing a composition according to claim 23.

28. A curable composition according to claim 23 wherein the composition comprises an antioxidant in an amount from 0.1 to 3 weight percent.

29. A curable composition according to claim 23 wherein the composition comprises an antioxidant in an amount from 0.15 to 1.5 weight percent.

30. A curable composition according to claim 23 wherein the composition comprises two antioxidants each of which are present in an amount from 0.1 to 3 weight percent.

31. A curable composition according to claim 23 wherein the composition comprises two antioxidants each of which are present in an amount from 0.15 to 1.5 weight percent.

* * * * *